(12) United States Patent
Lee

(10) Patent No.: US 8,136,973 B2
(45) Date of Patent: Mar. 20, 2012

(54) LIGHTING APPARATUS

(75) Inventor: Junghoon Lee, Gumi (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 12/528,775

(22) PCT Filed: Apr. 4, 2008

(86) PCT No.: PCT/KR2008/001900
§ 371 (c)(1),
(2), (4) Date: Aug. 26, 2009

(87) PCT Pub. No.: WO2008/123693
PCT Pub. Date: Oct. 16, 2008

(65) Prior Publication Data
US 2010/0110718 A1 May 6, 2010

(30) Foreign Application Priority Data
Apr. 4, 2007 (KR) .................. 10-2007-0033129

(51) Int. Cl.
*F21V 7/04* (2006.01)
(52) U.S. Cl. .................. 362/551; 362/297; 362/298
(58) Field of Classification Search .............. 362/297, 362/298, 346, 551, 558, 511, 296.05
See application file for complete search history.

(56) References Cited

U.S. PATENT DOCUMENTS

| | | | | |
|---|---|---|---|---|
| 4,084,215 A | * | 4/1978 | Willenbrock | 362/511 |
| 4,816,975 A | * | 3/1989 | Bahnemann et al. | 362/297 |
| 5,918,973 A | | 7/1999 | Nojiri | |
| 6,123,429 A | | 9/2000 | Osawa | |
| 6,612,729 B1 | * | 9/2003 | Hoffman | 362/551 |
| 7,025,475 B2 | * | 4/2006 | Yamazaki et al. | 362/298 |
| 7,390,116 B2 | * | 6/2008 | Jain | 362/551 |
| 2004/0179371 A1 | * | 9/2004 | Morishita et al. | 362/346 |
| 2006/0083005 A1 | | 4/2006 | Sokolov et al. | |
| 2007/0242473 A1 | | 10/2007 | Lee et al. | |

FOREIGN PATENT DOCUMENTS

| | | |
|---|---|---|
| JP | 10-321023 A | 12/1998 |
| JP | 2000-162445 A | 6/2000 |
| KR | 2001-0113640 A | 12/2001 |
| KR | 10-2006-0122485 A | 11/2006 |
| KR | 20-0432241 Y1 | 11/2006 |

* cited by examiner

Primary Examiner — Y My Quach Lee
(74) Attorney, Agent, or Firm — Birch, Stewart, Kolasch & Birch, LLP

(57) ABSTRACT

A lighting apparatus is disclosed. The lighting apparatus includes a light source, a first reflective unit reflecting light, a second reflective unit that is positioned opposite the first reflective unit and reflects the light, and a light pipe positioned outside the first reflective unit. The light source is positioned inside the first reflective unit. The light pipe receives the light reflected by the first reflective unit or the second reflective unit to emit the light.

19 Claims, 7 Drawing Sheets

[Fig. 1]
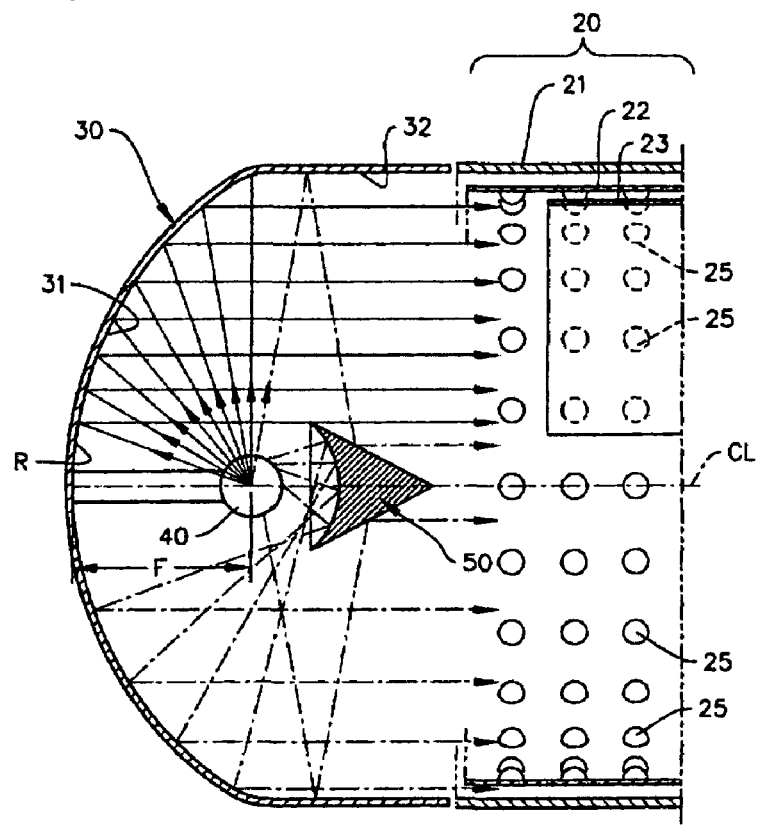
[Fig. 2]
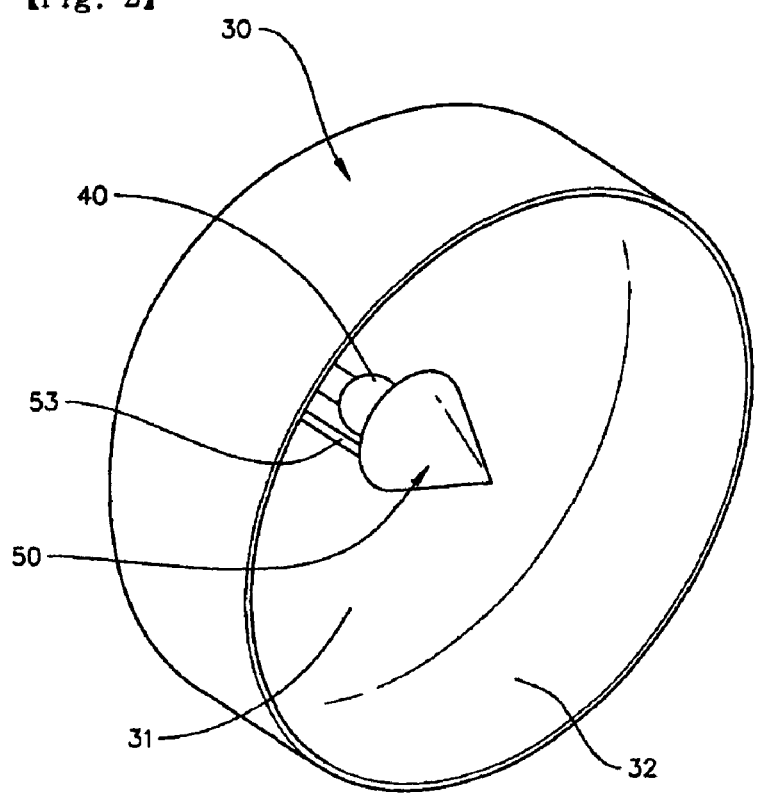

[Fig. 3]
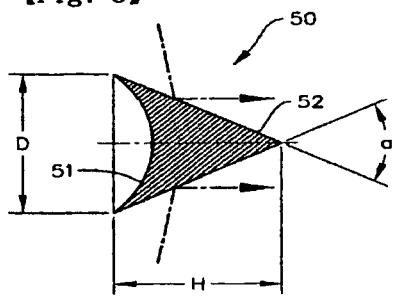
[Fig. 4]
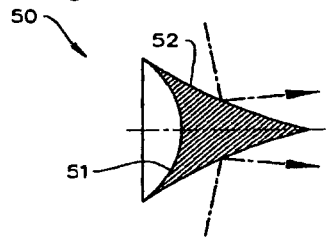
[Fig. 5]
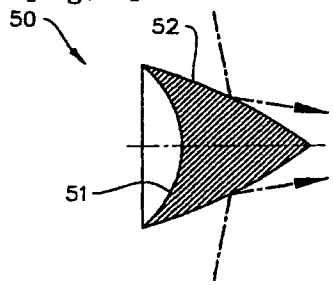
[Fig. 6]
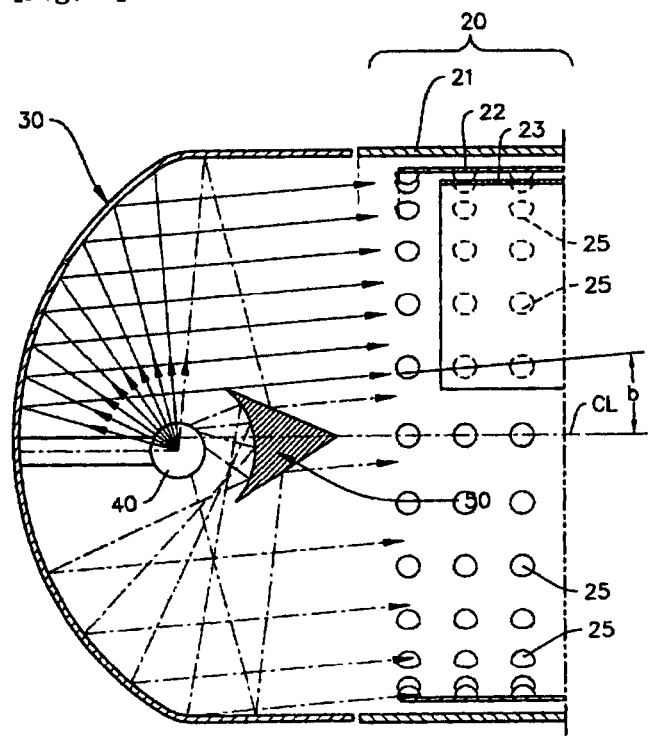

[Fig. 7]
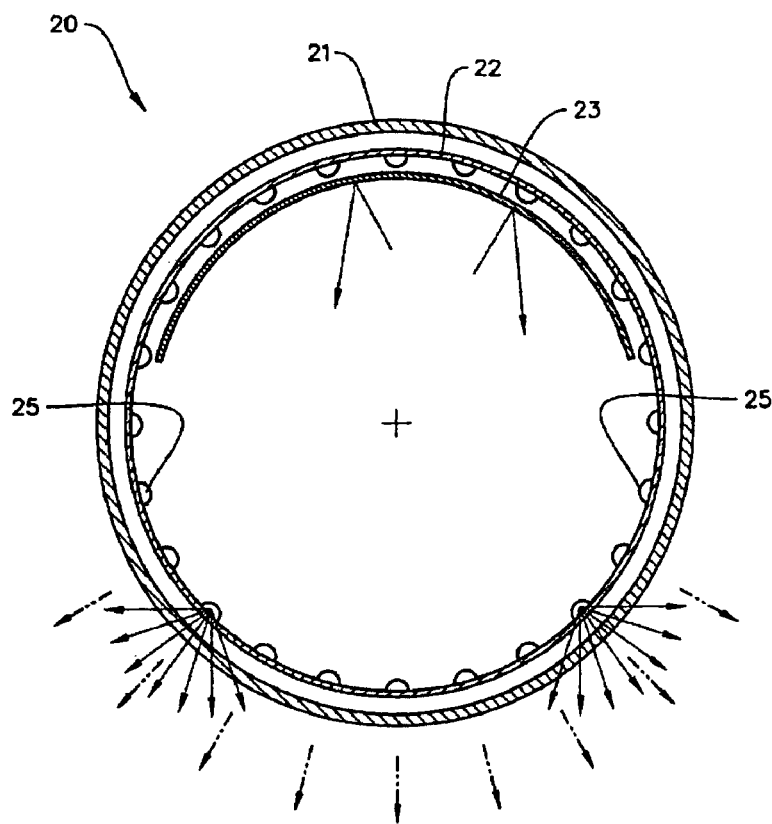
[Fig. 8]
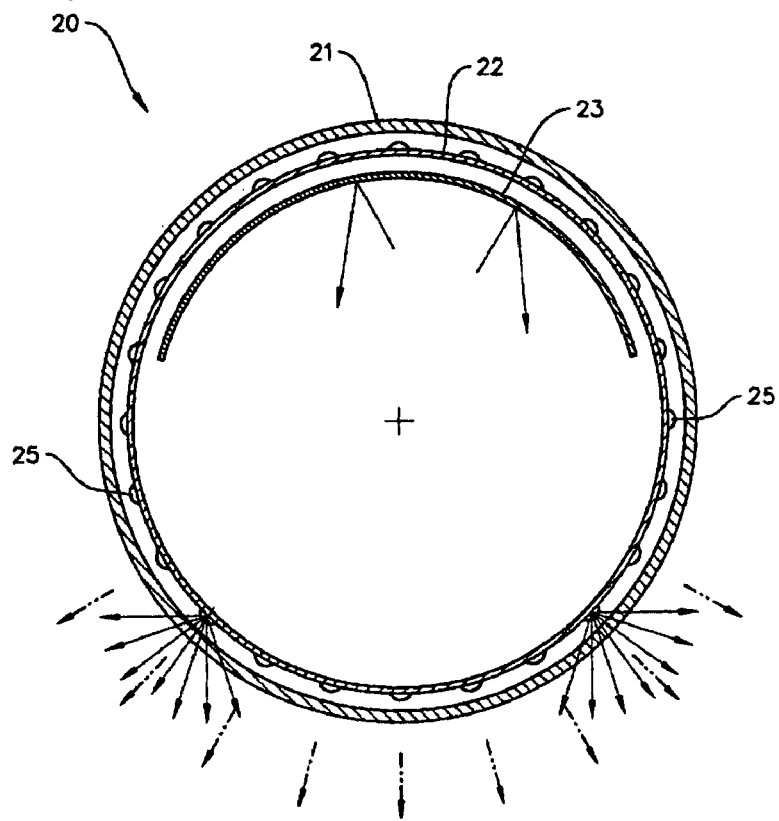

[Fig. 9]
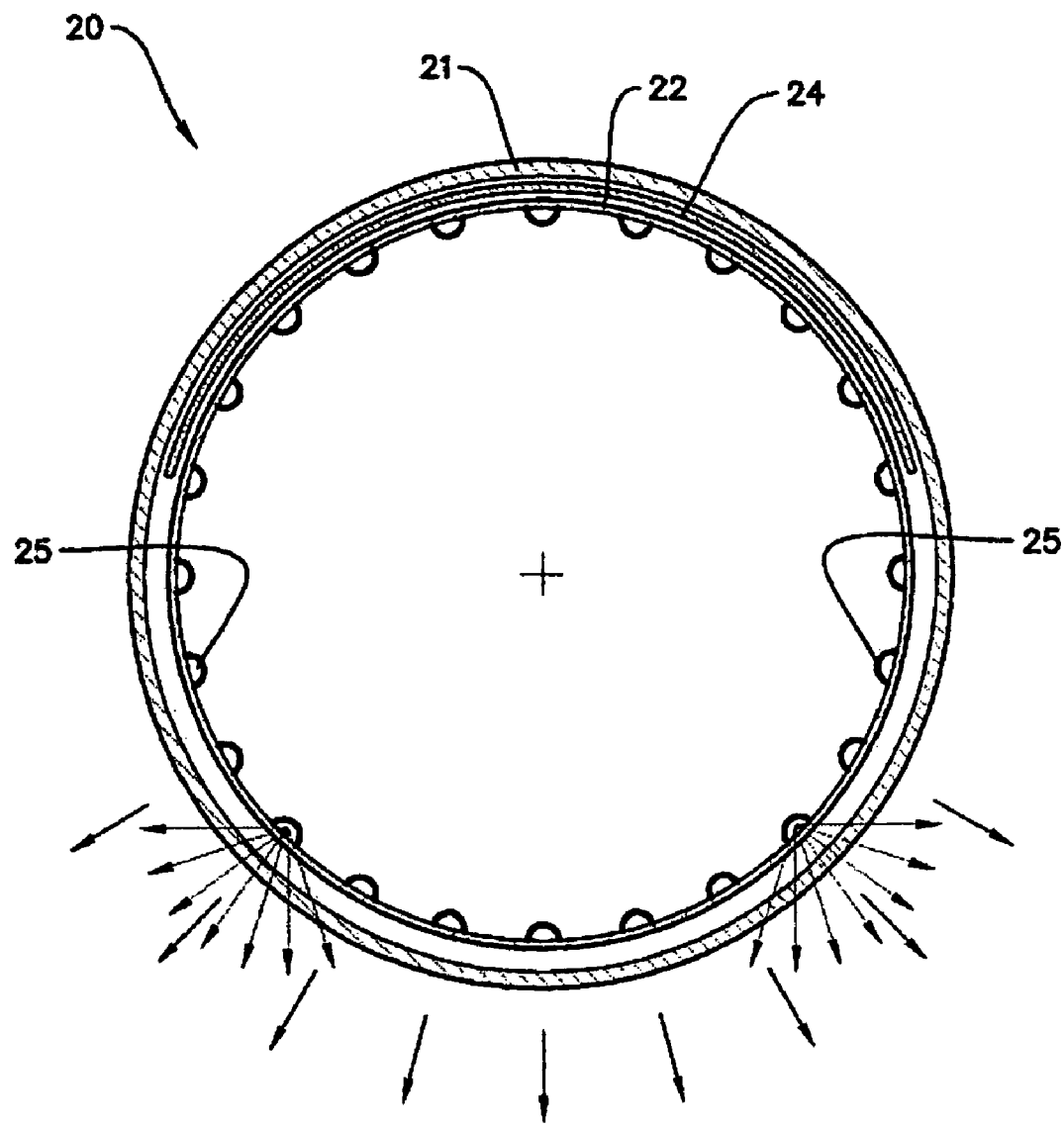

[Fig. 10]
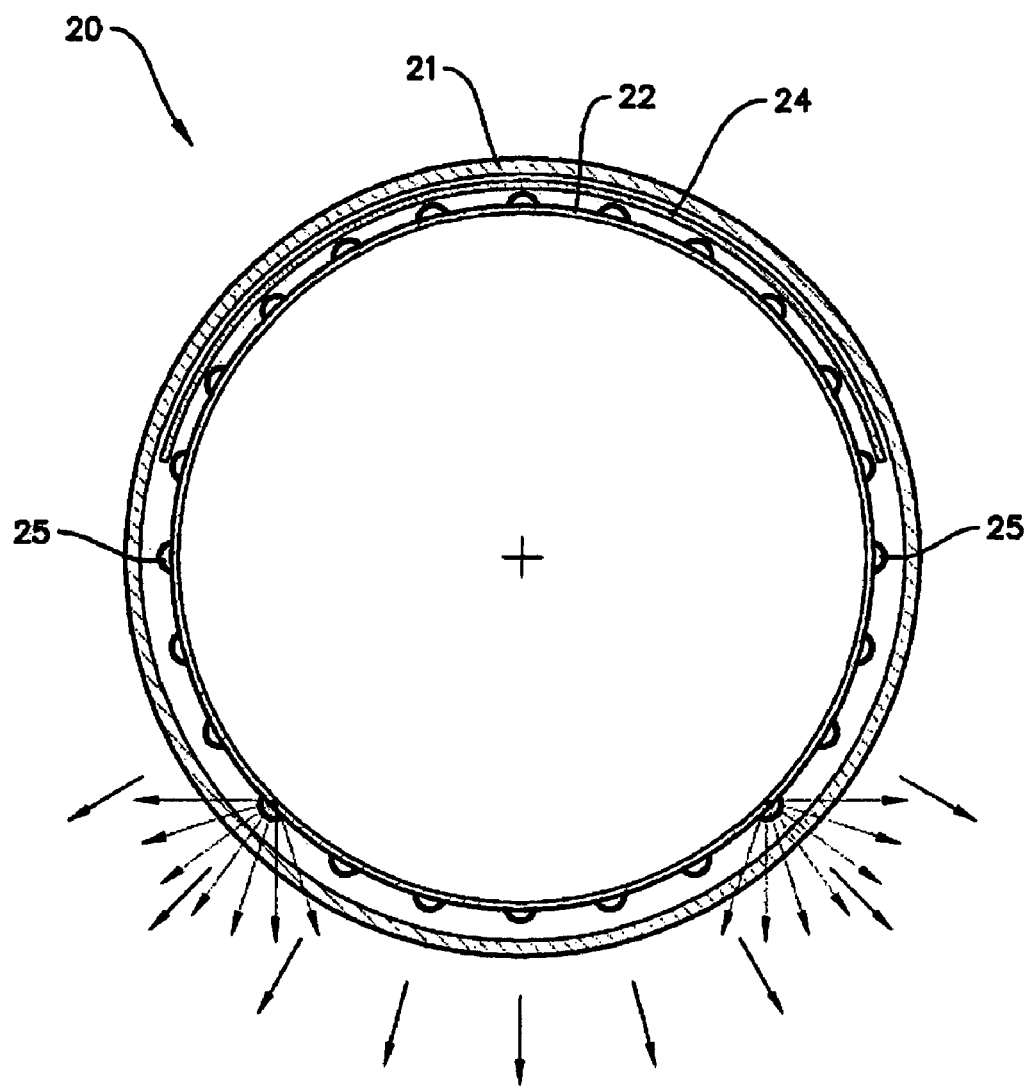

[Fig. 11]
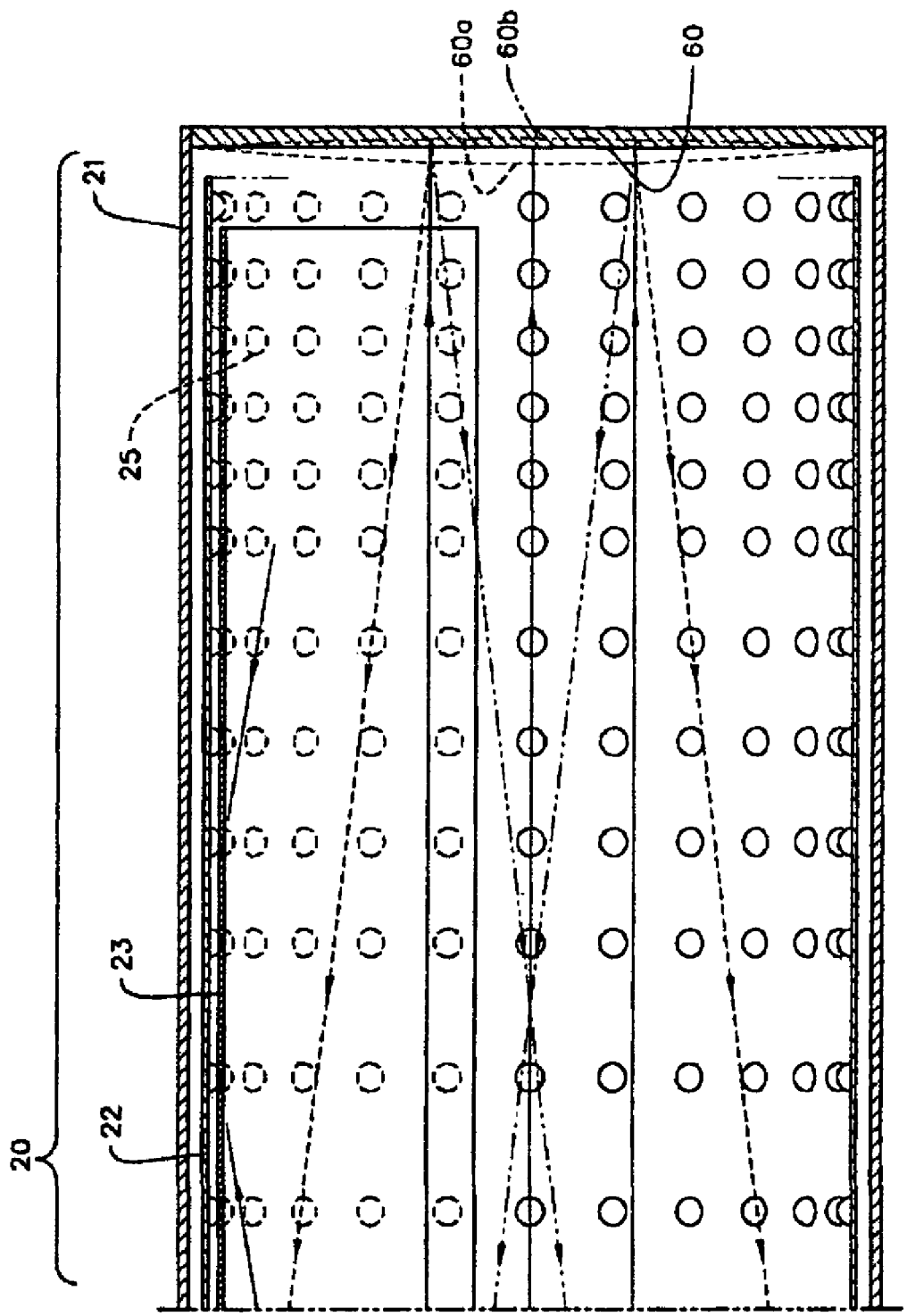

[Fig. 12]
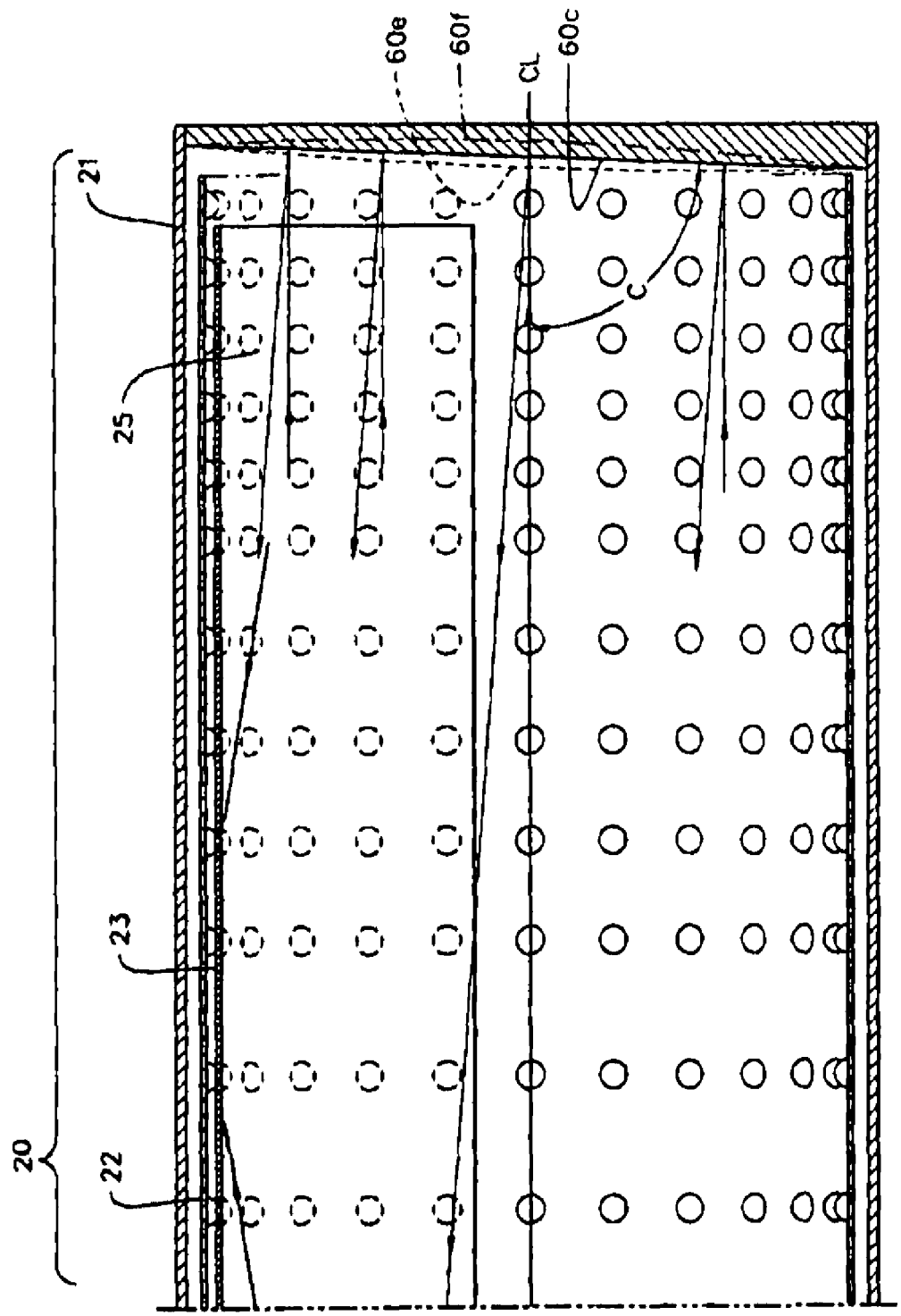

LIGHTING APPARATUS

TECHNICAL FIELD

An exemplary embodiment relates to a lighting apparatus.

BACKGROUND ART

A lighting apparatus is generally installed in an outdoor place such as a street and a park, and thus helps people perform everyday activities in the dark outdoor place at a night.

DISCLOSURE OF INVENTION

Technical Problem

The lighting apparatus is generally classified into a direct lighting apparatus and an indirect lighting apparatus. In case of the direct lighting apparatus, light directly radiates around the outdoor place, and thus a large amount of light radiates in an air. Therefore, the illumination efficiency is reduced and an effulgent phenomenon occurs.

On the other hand, in case of the indirect lighting apparatus, the outdoor place is illuminated by reflecting light using a reflector. Therefore, as the light goes far from the reflector, an intensity of light significantly falls, and thus the illumination efficiency is reduced.

Recently, the lighting apparatus has been installed in consideration of a night view as well as a help of everyday activities. However, the lighting apparatus with a high luminance may make passengers effulgent and may necessarily generate a high thermal.

In case that the lighting apparatus is installed on the top, the lighting apparatus illuminates downward and does not illuminate sideward. In case that the lighting apparatus is installed to illuminate sideward, light is directly irradiated to the passengers, and thus the passengers feel discomfort.

Technical Solution

An exemplary embodiment provides a lighting apparatus capable of simultaneously increasing the illumination efficiency and a sense of beauty.

An exemplary embodiment also provides a lighting apparatus capable of reducing the number of elements constituting the lighting apparatus.

In one aspect, a lighting apparatus comprises a light source, a first reflective unit reflecting light, the light source being positioned inside the first reflective unit, a second reflective unit that is positioned opposite the first reflective unit and reflects the light, and a light pipe positioned outside the first reflective unit, the light pipe receiving the light reflected by the first reflective unit or the second reflective unit to emit the light.

In another aspect, a lighting apparatus comprises a light source, a first reflective unit reflecting light, the light source being positioned inside the first reflective unit, a second reflective unit that is positioned opposite the first reflective unit and reflects the light, a light pipe positioned outside the first reflective unit, a reflector positioned in an end portion of the light pipe, the reflector reflecting the light reflected by the first reflective unit or the second reflective unit, and an optical film positioned inside the light pipe, the optical film receiving the light reflected by the first reflective unit or the second reflective unit and the light reflected by the reflector to emit the light.

Advantageous Effects

Accordingly, the lighting apparatus according to the exemplary embodiment can move light produced by the light source to an object in the distance without a loss of the light by reflecting the light using the first reflective unit or the second reflective unit in the form of surface light with the directionality and irradiating the surface light inside the light pipe. In particular, because the surface light with the directionality can be irradiated to be focused by the inside reflective member, the light efficiency can be improved.

Because the reflectors reflect incident light and the reflected light is focused by the inside reflective member, the light efficiency can be improved.

Further, the light pipe allows light produced by the light source to be uniformly emitted to a location close to the light source and a location far from the light source, and thus an effulgent phenomenon can be prevented.

Because light produced by the light source is emitted to the outside in the form of not point light but surface light, a possibility of an occurrence of a shadow can be reduced to the minimum.

BRIEF DESCRIPTION OF THE DRAWINGS

FIG. 1 is a diagram for explaining a light source of the lighting apparatus according to the exemplary embodiment;

FIG. 2 is a perspective view of the light source of FIG. 3;

FIGS. 3 to 5 are cross-sectional views of a second reflective unit of a light source of the lighting apparatus according to the exemplary embodiment;

FIG. 6 is a diagram for explaining another example of a light source of the lighting apparatus according to the exemplary embodiment;

FIGS. 7 to 10 are longitudinal cross-sectional views of a light pipe of the lighting apparatus according to the exemplary embodiment;

FIG. 11 is a diagram for explaining an example of a reflective unit of the lighting apparatus according to the exemplary embodiment; and FIG. 12 is a diagram for explaining another example of a reflective unit of the lighting apparatus according to the exemplary embodiment.

BEST MODE FOR CARRYING OUT THE INVENTION

FIG. 1 is a diagram for explaining a light source of the lighting apparatus according to the exemplary embodiment.

As shown in FIG. 1, a light source 40 may be positioned inside the first reflective unit 30, and a second reflective unit 50 may be positioned outside the light source 40. The light source 40 may be a point light source.

A portion of light produced by the light source 40 is first reflected by the first reflective unit 30, and then is irradiated to a light pipe 20 in the form of parallel light or semi-parallel light. Further, a portion of light produced by the light source 40 is firstly reflected by the second reflective unit 50, and then is secondly reflected by the first reflective unit 30. Then, the secondly reflected light is irradiated to a light pipe 20 in the form of parallel light or semi-parallel light. Further, a portion of light produced by the light source 40 is firstly reflected by the first reflective unit 30, and then is secondly reflected by the second reflective unit 50. Then, the secondly reflected light is irradiated on the light pipe 20 in the form of parallel light or semi-parallel light.

The first reflective unit 30 includes a first reflective surface 31 and a second reflective surface 32. The first reflective surface 31 may include a spherical surface with the curvature or an aspherical surface with the curvature, and the second reflective surface 32, as shown in FIG. 2, may have a cylinder shape.

Further, although the second reflective surface 32 is not specifically shown, the second reflective surface 32 may have a tapered pipe shape.

A relationship between the curvature of the first reflective unit 30 and the light source 40 may be defined by the following equation 1.

$$R=2F \quad \text{[Equation 1]}$$

In the above equation 1, R indicates the curvature of the first reflective surface 31, and F indicates a focus distance of the first reflective surface 31.

In particular, the light source 40 may be positioned on a central line CL of the light pipe 20. The light source 40 may be positioned depending on the focus distance F of the first reflective surface 31. Because the light source 40 is positioned inside the first reflective unit 30, the focus distance F has a positive number.

When the above equation 1 is satisfied, point light irradiated by the light source 40 is reflected by the first reflective unit 30, and the reflected light is irradiated parallel or semi-parallel to the central line CL of the light pipe 20 in the form of surface light.

A relationship between the curvature of the first reflective unit 30 and the light source 40 may be defined by the following equation 2.

$$R>2F \quad \text{[Equation 2]}$$

In the above equation 2, R indicates the curvature of the first reflective surface 31, and F indicates a focus distance of the first reflective surface 31.

The light source 40 may be positioned on the central line CL of the light pipe 20. Because the light source 40 is positioned inside the first reflective unit 30, the focus distance F has a positive number.

When the above equation 2 is satisfied, point light of the light source 40 is reflected by the first reflective unit 30. The reflected light is diffused as it goes far from the light source 40, and then is irradiated in the form of semi-parallel light.

The irradiated light is reflected by an optical film 22 or an inside reflective member 23 which will be described later.

A relationship between the curvature of the first reflective unit 30 and the light source 40 may be defined by the following equation 3.

$$R>2F \quad \text{[Equation 3]}$$

In the above equation 3, R indicates the curvature of the first reflective surface 31, and F indicates a focus distance of the first reflective surface 31.

The light source 40 may be positioned on the central line CL of the light pipe 20. Because the light source 40 is positioned inside the first reflective unit 30, the focus distance F has a positive number.

When the above equation 3 is satisfied, the first reflective unit 30 reflects light produced by the light source 40 and irradiates the light on the light pipe 20 in the form of parallel light or semi-parallel light.

The second reflective unit 50, as shown in FIG. 2, may have a cone shape. The second reflective unit 50 may be supported by a support member 53, and the support member 53 may be fixed inside the first reflective unit 30.

The second reflective unit 50 includes a third reflective surface 51 corresponding to a base of the cone-shaped second reflective unit 50, and a fourth reflective surface 52 corresponding to an outer surface of the cone-shaped second reflective unit 50.

The third reflective surface 51 may include a spherical surface with the curvature or an aspherical surface with the curvature. An outer surface of the fourth reflective surface 52, as shown in FIGS. 5 to 7, may be a straight surface or an incurve or outcurve surface with the curvature.

FIG. 3 is a cross-sectional view of an example of the second reflective unit 50 where the outer surface of the fourth reflective surface 52 is a straight surface.

A ratio D/H of a length D of the base of the second reflective unit 50 to a height H of the second reflective unit 50 may lie substantially in a range between 100:13 and 100:87. The range is a range where the light secondly reflected by the second reflective unit 50 can be reflected in the form of parallel light or semi-parallel light.

The fourth reflective surface 52 may have a triangle-shaped section. An angle "a" formed by the both sides of the fourth reflective surface 52 may lie substantially in a range between 60° and 150°. The range is a range where the light secondly reflected by the second reflective unit 50 can be reflected in the form of parallel light or semi-parallel light.

FIG. 4 is a cross-sectional view of another example of the second reflective unit 50 where the outer surface of the fourth reflective surface 52 is a concave curved surface with the curvature.

Because the outer surface of the fourth reflective surface 52 is a concave curved surface with the curvature, light secondly reflected from the fourth reflective surface 52 may be diffused in a reverse taper form as the light goes far from the light source 40 based on the central line CL. In particular, light which is firstly reflected from the first reflective surface 31 or the second reflective surface 32 of the first reflective unit 30 and then is incident on the second reflective unit 50 can be secondly reflected from the fourth reflective surface 52 in the form of parallel light or semi-parallel light.

FIG. 5 is a cross-sectional view of another example of the second reflective unit 50 where the outer surface of the fourth reflective surface 52 is a convex curved surface with the curvature.

Because the outer surface of the fourth reflective surface 52 is a convex curved surface with the curvature, light secondly reflected from the fourth reflective surface 52 may be focused toward the central line CL and then may be diffused. In particular, light which is firstly reflected from the second reflective surface 32 of the first reflective unit 30 and then is incident on the second reflective unit 50 can be secondly reflected from the fourth reflective surface 52 in the form of parallel light or semi-parallel light.

MODE FOR THE INVENTION

FIG. 6 is a diagram for explaining another example of a light source of the lighting apparatus according to the exemplary embodiment.

Unlike the light source 40 shown in FIG. 1, the light source 40 shown in FIG. 6 may be positioned at a location deviating from the central line CL of the light pipe 20.

Because the light source 40 is positioned at the location deviating from the central line CL of the light pipe 20, light firstly reflected by the first reflective unit 30 is irradiated toward a reverse direction of the light source 40 based on the central line CL. In particular, parallel light of the light is irradiated with the directionality so that the parallel light makes an angle "b" with the central line CL.

As described above, the light with the angle "b" can be irradiated more effectively by the inside reflective member 23. The inside reflective member 23 may have an arc shape or a cylinder shape.

In case that the inside reflective member 23 has the arc shape and the light is irradiated at the predetermined angle "b" the irradiated light may be focused by the inside reflective member 23. Hence, the light efficiency can be improved.

Accordingly, the lighting apparatus according to the exemplary embodiment can move the light produced by the light source 40 to an object in the distance without the optical lighting film and the lens unit.

FIGS. 7 to 10 are longitudinal cross-sectional views of a light pipe of the lighting apparatus according to the exemplary embodiment.

As shown in FIGS. 7 to 10, the optical film 22 may be positioned on an inner circumferential surface of the light pipe 20. The inside reflective sheet 23 or outside reflective sheet 24 may be positioned on an inner or outer circumferential surface of the optical film 22. The optical film 22 receives light reflected by the first and second reflective units 30 and 50 and light reflected by a reflector 60 to emit the light to the outside.

The optical film 22 includes dot patterns 25. The dot patterns 25, as shown in FIGS. 7 and 9, may extend from an inner surface of the optical film 22. The dot patterns 25, as shown in FIGS. 8 and 10, may extend from an outer surface of the optical film 22. The dot patterns 25 may have various patterns such as a hemisphere, a cylinder, a polygon. However, the dot pattern 25 is not limited thereto. The dot patterns 25 may have any form slightly extending from the inner surface or the outer surface of the optical film 22.

FIG. 11 is a diagram for explaining an example of a reflective unit of the lighting apparatus according to the exemplary embodiment.

As shown in FIG. 11, the dot patterns 25 may be densely arranged as they go far from the light source 40. The dot patterns 25 irradiate light, which is incident on the optical film 22 and then is refracted or reflected, to the outside.

The reflector 60 may be formed in a flat form. Light perpendicularly incident on the surface of the reflector 60 of the flat form is straightly reflected, and light diagonally incident on the surface of the reflector 60 of the flat form at a predetermined angle is reflected at a predetermined angle. The straightly reflected parallel or semi-parallel light is refracted or reflected by the dot patterns 25 of the optical film 22 to be emitted to the outside.

A reflector 60a may be formed in a convex form, and a convex surface may have the curvature. Most of light incident on the surface of the reflector 60a having a convex reflective surface is diffused and then reflected.

A reflector 60b may be formed in a concave form, and a concave surface may have the curvature. Most of light incident on the surface of the reflector 60b having a concave reflective surface is focused and then diffused.

FIG. 12 is a diagram for explaining another example of a reflective unit of the lighting apparatus according to the exemplary embodiment.

As shown in FIG. 12, a reflector 60c may be formed in a flat form, and the surface of the reflector 60c to be reflected may be inclined to the central line CL of the light pipe 20 at an angle "c" As above, because the reflected surface of the reflector 60c is inclined at the angle "c" light is irradiated in a predetermined direction. In other words, the light can have the directionality.

In particular, parallel light incident on the reflector 60c is reflected in a predetermined direction, and then the reflected light may be focused by the inside reflective member 23.

A reflector 60e may be formed in a convex form, a convex surface may have the curvature, and the surface of the reflector 60e to be reflected may be inclined to the central line CL of the light pipe 20 at the angle "c" Most of light incident on the surface of the reflector 60e having a convex reflective surface is diffused and then reflected. Further, because most of the incident light is diffused at the angle "c" the reflected light can be focused by the inside reflective member 23.

A reflector 60f may be formed in a concave form, a concave surface may have the curvature, and the surface of the reflector 60f to be reflected may be inclined to the central line CL of the light pipe 20 at the angle "c" Most of light incident on the surface of the reflector 60f having a convex reflective surface is focused, and then diffused. Further, because the focused light is diffused at the angle "c" the diffused light is reflected and then the reflected light can be focused by the inside reflective member.

The invention claimed is:

1. A lighting apparatus comprising:
a light source;
a first reflective unit reflecting light, the light source being positioned inside the first reflective unit;
a second reflective unit that is positioned opposite the first reflective unit and reflects the light; and
a light pipe positioned outside the first reflective unit, the light pipe receiving the light reflected by the first reflective unit or the second reflective unit to emit the light
wherein the second reflective unit has a cone-shape, and includes a third reflective surface corresponding to a base of the cone-shaped second reflective unit, and a fourth reflective surface corresponding to an outer surface of the cone-shaped second reflective unit, and
wherein the third reflective surface is a spherical surface with curvature or an aspherical surface with curvature.

2. The lighting apparatus of claim 1, wherein the first reflective unit includes a first reflective surface and a second reflective surface, and the light source is positioned at a focus location of the first reflective surface.

3. The lighting apparatus of claim 2, wherein the first reflective surface includes a spherical surface with the curvature or an aspherical surface with the curvature.

4. The lighting apparatus of claim 1, wherein the light source is positioned at a location deviating from a central line of the light pipe.

5. The lighting apparatus of claim 1, wherein the fourth reflective surface is any one of a straight surface, a spherical surface with the curvature, and an aspherical surface with the curvature.

6. The lighting apparatus of claim 1, wherein a ratio of a length of a base of the second reflective unit to a height of the second reflective unit lies substantially in a range between 100:13 and 100:87.

7. The lighting apparatus of claim 1, claim 5, wherein an angle formed by both sides of the fourth reflective surface lies substantially in a range between 60° and 150°.

8. The lighting apparatus of claim 1, further comprising a reflector positioned in an end portion of the light pipe, the reflector reflecting the light reflected by the first reflective unit or the second reflective unit.

9. The lighting apparatus of claim 8, wherein the reflector includes a flat surface or a surface with the curvature.

10. The lighting apparatus of claim 9, wherein the surface of the reflector is inclined.

11. The lighting apparatus of claim 1, wherein the fourth reflective surface has a straight, convex or concave configuration.

12. A lighting apparatus comprising:
a light source;
a first reflective unit reflecting light, the light source being positioned inside the first reflective unit;
a second reflective unit that is positioned opposite the first reflective unit and reflects the light;
a light pipe positioned outside the first reflective unit;
a reflector positioned in an end portion of the light pipe, the reflector reflecting the light reflected by the first reflective unit or the second reflective unit; and
an optical film positioned inside the light pipe, the optical film receiving the light reflected by the first reflective unit or the second reflective unit and the light reflected by the reflector to emit the light,
wherein the second reflective unit has a cone-shape, and includes a third reflective surface corresponding to a base of the cone-shaped second reflective unit, and a fourth reflective surface corresponding to an outer surface of the cone-shaped second reflective unit, and
wherein the third reflective surface is a spherical surface with curvature or an aspherical surface with curvature.

13. The lighting apparatus of claim 12, further including an inside reflective sheet or an outside reflective sheet positioned inside the light pipe, the inside reflective sheet or the outside reflective sheet receiving the light reflected by the first reflective unit or the second reflective unit and the light reflected by the reflector to emit the light to the outside.

14. The lighting apparatus of claim 12, wherein dot patterns are formed on an inner surface or an outer surface of the optical film.

15. The lighting apparatus of claim 14, wherein the dot patterns are densely arranged as they go far from the light source.

16. The lighting apparatus of claim 12, wherein the first reflective unit includes a first reflective surface and a second reflective surface, and the light source is positioned at a focus location of the first reflective surface.

17. The lighting apparatus of claim 12, wherein the fourth reflective surface is any one of a straight surface, a spherical surface with curvature, and an aspherical surface with curvature.

18. The lighting apparatus of claim 12, wherein a ratio of a length of a base of the second reflective unit to a height of the second reflective unit lies substantially in a range between 100:13 and 100:87, and an angle formed by both sides of the fourth reflective surface lies substantially in a range between 60° and 150°.

19. The lighting apparatus of claim 12, wherein the fourth reflective surface has a straight, convex or concave configuration.

* * * * *